A. F. DUSANTOY.
Sad Iron Heater.
No. 43,554.  Patented July 12, 1864.
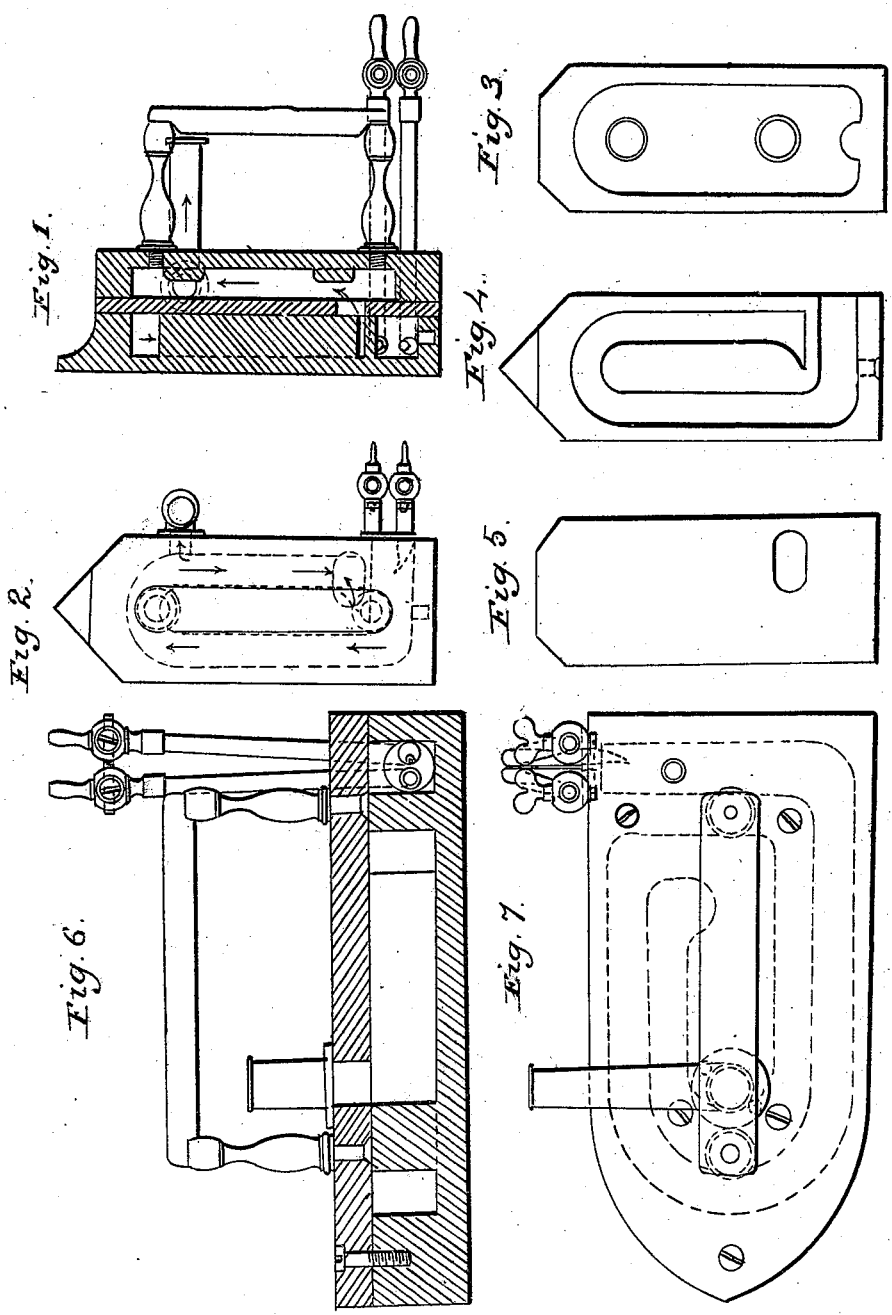

UNITED STATES PATENT OFFICE.

AUGUSTE FRANÇOIS DUSANTOY, OF NEUILLY ON THE SEINE, FRANCE, ASSIGNOR TO MORITZ PINNER, OF NEW YORK, N. Y.

IMPROVEMENT IN HEATING SAD-IRONS.

Specification forming part of Letters Patent No. 43,554, dated July 12, 1864.

*To all whom it may concern:*

Be it known that I, AUGUSTE FRANÇOIS DUSANTOY, of Neuilly on the Seine, in France, have invented new and useful Improvements in Smoothing and Pressing Irons and Apparatus for Heating the Same; and I do hereby declare that the following is a full and exact description thereof, reference being had to the accompanying drawings, and to the letters of reference marked thereon.

My invention consists of a novel construction of smoothing and pressing irons, which are heated by a combined jet of lighting and heating gas and air, acting in the manner of a blow-pipe within the iron itself.

The manner in which these improved irons are constructed is fully shown in the annexed sheet of drawings.

Figure I represents a sectional lateral elevation of this improved iron. Fig. II represents a plan of the same. Fig. III represents a plan of the upper portion or half of this improved iron. Fig. IV represents a plan of the lower portion or half of said iron. Fig. V represents a plan of the plate separating the two halves, which are secured together by screws. Figs. VI and VII represent simply modifications of Figs. I and II.

This arrangement is mainly intended to increase or accelerate the heating action by directing the caloric current through a succession of flues or chambers, as shown by arrows on the drawings. The heating-gas is supplied through a flexible tube by any suitable meter, and the air is injected through a like tube either by a blowing-engine or fan, as may be required; but in order to make these self-heating irons peculiarly applicable to domestic and other purposes—such as small laundries, tailoring and hatters' establishments, having no motive power at their disposal—I propose to supply the air necessary for blowing the gas-flame either by means of a small fan, to be driven by hand, or any animal power, or by means of a self-acting mechanism resembling those used in smoke-jacks or turn-spits, which are worked by one or several spiral springs jointly or successively, to be wound up every hour or two, in order to produce the slight blast required for the purpose herein set forth. By opening and shutting the gas and air tubes partially any desirable degree of heat for the above purposes can be secured, and with a very insignificant outlay for gas and labor these improved irons can be kept warm all the time.

Having thus fully described the manner of making and using these improved irons, I claim as my invention, and desire to secure by Letters Patent of the United States, the following, to wit:

The construction of a smoothing-iron, which is heated within the iron itself by a combined jet of lighting or heating gas and air, or its equivalent, and acting in the manner of a blow-pipe, substantially as herein set forth and described.

AUGUSTE FRANÇOIS DUSANTOY.

Witnesses:
E. SHERMAN GOULD,
F. COLHAUSEN.